US012744959B2

(12) United States Patent
Zhao et al.

(10) Patent No.: US 12,744,959 B2
(45) Date of Patent: Sep. 22, 2026

(54) INFORMATION DISPLAY METHOD AND APPARATUS

(71) Applicant: Beijing Zitiao Network Technology Co., Ltd., Beijing (CN)

(72) Inventors: Chenxuan Zhao, Beijing (CN); Hui Miao, Beijing (CN); Meilin Li, Beijing (CN); Wenchao Niu, Beijing (CN); Yuefeng Fu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/877,970

(22) PCT Filed: Nov. 15, 2023

(86) PCT No.: PCT/CN2023/131885
§ 371 (c)(1),
(2) Date: Dec. 20, 2024

(87) PCT Pub. No.: WO2024/125195
PCT Pub. Date: Jun. 20, 2024

(65) Prior Publication Data

US 2025/0373882 A1 Dec. 4, 2025

(30) Foreign Application Priority Data

Dec. 13, 2022 (CN) ........................ 202211596281.2

(51) Int. Cl.
*H04N 21/431* (2011.01)
*H04N 21/2187* (2011.01)

(52) U.S. Cl.
CPC ..... *H04N 21/4316* (2013.01); *H04N 21/2187* (2013.01)

(58) Field of Classification Search
CPC ....................... H04N 21/4316; H04N 21/2187
See application file for complete search history.

(56) References Cited

U.S. PATENT DOCUMENTS

| | | | | |
|---|---|---|---|---|
| 7,913,178 | B2 | 3/2011 | Gould et al. | |
| 9,462,017 | B1 | 10/2016 | Siracusano, Jr. | |
| 10,715,881 | B2 | 7/2020 | Qu et al. | |
| 2019/0080375 | A1* | 3/2019 | Alvarez | H04N 7/147 |
| 2024/0179355 | A1* | 5/2024 | Lin | G06V 10/16 |

FOREIGN PATENT DOCUMENTS

| | | | |
|---|---|---|---|
| CN | 109218776 | A | 1/2019 |
| CN | 111131850 | A | 5/2020 |

(Continued)

OTHER PUBLICATIONS

First Search Report for Chinese Application No. 2022115962812, received 2024, 2 pages.

(Continued)

*Primary Examiner* — Nnenna N Ekpo
(74) *Attorney, Agent, or Firm* — Astute IP Law Group

(57) ABSTRACT

The present application discloses a method for information display. In an example, the method can be applied to a client. The client can display a live-stream room interface, and the user can perform a resource sending operation on the live-stream room interface, and the resource sending operation is used to send a second resource to the streamer account. In an example, the user can be a user corresponding to a target account, and the target account has a first resource. In this case, the client can display the resource identifier of the first resource on the live-stream room interface in respond to the resource sending operation of the target account.

20 Claims, 6 Drawing Sheets

(56) References Cited

FOREIGN PATENT DOCUMENTS

| | | | |
|---|---|---|---|
| CN | 111277849 | A | 6/2020 |
| CN | 111327914 | A | 6/2020 |
| CN | 112291632 | A | 1/2021 |
| CN | 112738544 | A | 4/2021 |
| CN | 113163220 | A | 7/2021 |
| CN | 113382274 | A | 9/2021 |
| CN | 113411624 | A | 9/2021 |
| CN | 113596492 | A | 11/2021 |
| CN | 113625911 | A | 11/2021 |
| CN | 114053723 | A | 2/2022 |
| CN | 114630155 | A | 6/2022 |
| CN | 114915828 | A | 8/2022 |
| CN | 115002496 | A | 9/2022 |
| CN | 115278286 | A | 11/2022 |
| CN | 116033174 | A | 4/2023 |
| JP | 2019-071959 | A | 5/2019 |
| JP | 2020-088498 | A | 6/2020 |
| JP | 2021-145364 | A | 9/2021 |
| JP | 7125729 | B1 | 8/2022 |
| JP | 2022-133429 | A | 9/2022 |
| WO | 2022/005547 | A1 | 1/2022 |

OTHER PUBLICATIONS

International Search Report and Written Opinion for PCT/CN2023/131885, mailed on Jan. 16, 2024, 13 pages.

Supplementary Search Report for Chinese Application No. 2022115962812, received 2024, 1 page.

Decision to Grant received for Japanese Patent Application No. 2024-573443, mailed on Feb. 3, 2026, 5 pages (2 pages of English Translation and 3 pages of Original Document).

Notice of Reasons for Refusal for Japanese Application No. 2024-573443, dated Oct. 14, 2025, 14 pages (7 pages English translation, 7 pages original document).

Extended European Search Report received for European Application No. 23902395.5, mailed on Jun. 8, 2026, 11 pages.

* cited by examiner

INFORMATION DISPLAY METHOD AND APPARATUS

CROSS-REFERENCE TO RELATED APPLICATION(S)

The present application is a National Stage Application of PCT Application Serial No. PCT/CN2023/131885, filed Nov. 15, 2023, which claims priority to Chinese Application No. 202211596281.2 filed on Dec. 13, 2022 and titled "INFORMATION DISPLAY METHOD AND APPARATUS", the disclosures of which are incorporated herein by reference in their entireties.

FIELD

The present application relates to a field of computer technology, and in particular to an information display method and apparatus.

BACKGROUND

With the development of computer technology, some applications that provide live streaming functions have emerged. Users can initiate a live streaming or view a live streaming through these applications. In order to enhance an interaction between a streamer and a viewer during the live streaming, the viewer can trigger a resource sending operation on a live-stream room interface while viewing the live streaming, to send resources to the streamer.

After the viewer triggers the resource sending operation on the live-stream room interface, the information related to the resource sending operation will be displayed on the live streaming interface. However, the existing interactions for sending resources in the live-stream room is mono and cannot meet the diverse needs of users.

SUMMARY

In order to solve or at least partially solve the above technical problems, an embodiment of the present application provides a method and an apparatus for information display.

In a first aspect, an embodiment of the present application provides a method for information display.

The method comprises:

displaying a live-stream room interface;

displaying a resource identifier of a first resource on the live-stream room interface, in response to a resource sending operation of a target account having the first resource, wherein the resource sending operation is used to send a second resource to a streamer account.

Optionally, the method further comprises:

displaying prompt information on the live-stream room interface, in response to a completion of displaying the resource identifier of the first resource, wherein the prompt information is used to prompt that the target account has sent the second resource, the prompt information comprises a resource identifier of the second resource and descriptive information indicating a sending operation.

Optionally, displaying prompt information on the live-stream room interface in response to a completion of displaying the resource identifier of the first resource comprises:

displaying the prompt information in a preset area of the live-stream room interface, in response to a completion of displaying the resource identifier of the first resource in the preset area.

Optionally, displaying the resource identifier of the first resource on the live-stream room interface comprises:

displaying a video corresponding to the resource identifier of the first resource, and a video image of the video comprises the resource identifier of the first resource.

Optionally, the method further comprises:

displaying a details interface of the first resource, in response to a preset operation for triggering the resource identifier of the first resource or the video.

Optionally, the details interface of the first resource comprises a first area and a second area, and displaying the details interface of the first resource comprises:

displaying a resource option of at least one resource in the first area, the at least one resource comprises the first resource, wherein the resource option of the first resource is in a selected state;

dynamically displaying details information of the first resource in the second area.

Optionally, the first resource is associated with a first object, the second area further comprises a first interactive identifier, and the method further comprises:

displaying object information of the first object, in response to a trigger operation for the first interactive identifier.

Optionally, displaying object information of the first object comprises:

playing an introduction video of the first object.

Optionally, the method further comprises:

displaying, in the second area, right information of a first right comprised in the first resource, in response to a first operation triggered in the second area; or displaying, in the second area, right information of a second right, in response to a second operation for triggering a right identifier of the second right in a third area of the details interface, wherein the third area is used to display a right identifier of at least one right comprised in the first resource, and the at least one right comprises the second right.

Optionally, the method further comprises:

displaying, in the second area, right information of a third right comprised in the first resource, after a completion of displaying the details information of the first resource.

Optionally, the method further comprises:

dynamically displaying, in the second area, details information of a third resource, in response to a third operation triggered in the first area, and switching a state of a resource option of the third resource displayed in the first area into a selected state.

In a second aspect, an embodiment of the present application provides an apparatus for information display. The apparatus comprises:

a first display unit used to display a live-stream room interface;

a second display unit used to display a resource identifier of a first resource on the live-stream room interface in response to a resource sending operation of a target account having the first resource, wherein the resource sending operation is used to send a second resource to a streamer account.

Optionally, the apparatus further comprises:

a third display unit used to display prompt information on the live-stream room interface in response to a completion of displaying the resource identifier of the first resource, the prompt information is used to prompt that the target account has sent the second resource, the prompt information comprises a resource identifier of the second resource and descriptive information indicating a sending operation.

Optionally, the third display unit is used to:

displaying the prompt information in a preset area, in response to a completion of displaying the resource identifier of the first resource in the preset area of the live-stream room interface.

Optionally, the second display unit is used to:

displaying a video corresponding to the resource identifier of the first resource, and a video image of the video comprises the resource identifier of the first resource.

Optionally, the apparatus further comprises:

a fourth display unit used to display a details interface of the first resource in response to a preset operation for triggering the resource identifier of the first resource or the video.

Optionally, the details interface of the first resource comprises a first area and a second area, and the fourth display unit is used to:

display a resource option of at least one resource in the first area, the at least one resource comprises the first resource, and the resource option of the first resource are in a selected state;

dynamically display details information of the first resource in the second area.

Optionally, the first resource is associated with a first object, the second area further comprises a first interactive identifier, and the apparatus further comprises:

a fifth display unit used to display object information of the first object in response to a trigger operation for the first interactive identifier.

Optionally, the fifth display unit is used to play an introduction video of the first object.

Optionally, the apparatus further comprises:

a sixth display unit used to:

display, in the second area, right information of a first right comprised in the first resource, in response to a first operation triggered in the second area; or display, in the second area, right information of a second right, in response to a second operation for triggering a right identifier of the second right in a third area of the details interface, and the third area is used to display a right identifier of at least one right comprised in the first resource, and the at least one right comprises the second right.

Optionally, the apparatus further comprises:

a seventh display unit used to display, in the second area, right information of a third right comprised in the first resource, after a completion of displaying the details information of the first resource.

Optionally, the apparatus further comprises:

an eighth display unit used to dynamically display, in the second area, details information of a third resource in response to a third operation triggered in the first area;

a state switching unit used to switch a state of a resource option of the third resource displayed in the first area into a selected state.

In a third aspect, an embodiment of the present application provides a device comprising a processor and a memory;

the processor is used to execute instructions stored in the memory, to cause the device to execute the method according to any of the first aspects.

In a fourth aspect, an embodiment of the present application provides a computer-readable storage medium comprising instructions, wherein the instructions instruct a device to execute the method according to any of the first aspects.

In a fifth aspect, an embodiment of the present application provides a computer program product, wherein the computer program product, when executed on a computer, causes the computer to execute the method according to any of the first aspects.

Compared with the prior art, the embodiments of the present application have the following advantages.

The embodiment of the present application provides a method for information display. In an example, the method can be applied to a client. The client can display a live-stream room interface, and the user can perform a resource sending operation on the live-stream room interface, and the resource sending operation is used to send a second resource to a streamer account. In an example, the user can be a user corresponding to a target account, and the target account has a first resource. In this case, the client can display a resource identifier of the first resource on the live-stream room interface in respond to the resource sending operation of the target account. It can be seen that, with the solution of the embodiment of the present application, for the target account having a first resource, after performing the resource sending operation in the live-stream room, the resource identifier of the first resource can be displayed on the live-stream room interface. Therefore, by combining the first resource and the second resource, the interaction for sending resources in the live-stream room is enriched, which is conducive to meeting the diverse needs of users.

BRIEF DESCRIPTION OF THE DRAWINGS

In order to illustrate the technical solutions in the embodiments of the present application or the prior art more clearly, the drawings needed to be used in the description of the embodiments or the prior art will be briefly introduced below. Obviously, the drawings in the following description are only some of the embodiments of the present application. For those of ordinary skill in the art, other drawings may also be obtained based on these drawings without exercising inventive labor.

DETAILED DESCRIPTION OF EMBODIMENTS

In order to enable those skilled in the art to better understand the solution of the present application, the technical solution in the embodiments of the present application will be clearly and completely described below in conjunction with the drawings in the embodiments of the present application. Obviously, the described embodiments are only part of the embodiments of the present application, not all of the embodiments. Based on the embodiments in the present application, all other embodiments obtained by ordinary technicians in this field without creative work are within the scope of protection of the present application.

The inventor of the present application has found through research that, currently, for a certain account, if the account triggers a resource sending operation on the live-stream room interface, the live-stream room interface will display an account identifier of the account, so that other users can determine through the live-stream room interface that this account has sent resources to the streamer. This account triggers the resource sending operation on the live-stream room interface, for example, the user triggers the resource sending operation on the live-stream room interface through this account.

However, after the resource sending operation is triggered, the existing interaction for sending resources in the live-stream room is mono and cannot meet the diverse needs of users. Especially for some accounts with preset resources, users hope that after the resource sending operation is triggered through this account, the information displayed and the interaction provided on the live-stream room interface can be richer.

In order to solve the above problems, the embodiments of the present application provide a method and an apparatus for information display.

Various non-limiting implementations of the present application are described in detail below in conjunction with the accompanying drawings.

EXEMPLARY METHODS

Figure 1:
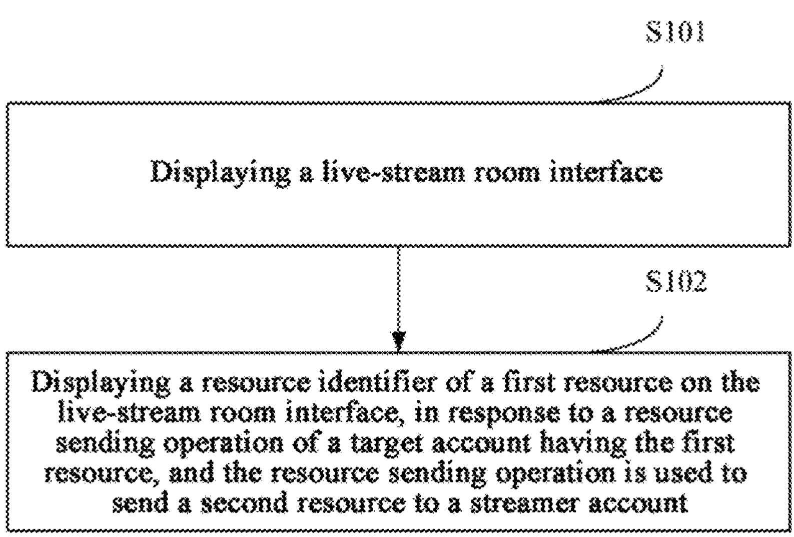
FIG. 1 is a schematic diagram of a flow chart of a method for information display provided in an embodiment of the present application.

Refer to FIG. 1, which is schematic diagram of a flow chart of a method for information display provided in an embodiment of the present application. In this embodiment, the method can be applied to a client, for example. In an example, the method can comprise the following steps S101-S102.

S101: Displaying the live-stream room interface.

In an embodiment of the present application, the client can display the live-stream room interface in response to a specific operation triggered on the first interface. The embodiment of the present application does not specifically limit the first interface, and the first interface can be a live streaming preview interface of the live-stream room interface, or another live-stream room interface, or other interfaces, which are not listed here one by one.

In an embodiment of the present application, the live-stream room interface can be used to play live streaming video, and the embodiment of the present application does not specifically limit the content of the live streaming video.

S102: Displaying a resource identifier of a first resource on the live-stream room interface, in response to a resource sending operation of a target account having the first resource, and the resource sending operation is used to send a second resource to a streamer account.

In an example, the target account can trigger a resource sending operation on the live-stream room interface, and the resource sending operation is used to send a second resource to the streamer account. As an example, the user corresponding to the target account can click a resource sending control on the live-stream room interface, and the client can display a resource selection interface in response to the trigger operation for the resource sending control, and the resource selection interface may comprise multiple resources that can be sent, and the multiple resources that can be sent comprise the second resource. The user corresponding to the target account can trigger a selection operation for the second resource in the resource selection interface, and further trigger a sending confirmation operation for the second resource, such as clicking the sending confirmation control in the resource selection interface, so as to realize the sending of the second resource to the streamer account. The second resource mentioned in the embodiment of the present application can be, for example, a virtual object that can be sent in the live-stream room interface, such as a virtual gift.

The target account mentioned in the embodiment of the present application can be an account corresponding to any user who is viewing the live-stream room interface. In an example, the target account can be an account that has currently performed a resource sending operation on the live-stream room interface.

In an embodiment of the present application, for a target account that has a first resource, the client can display a resource identifier of the first resource on the live-stream room interface in response to the target account performing the resource sending operation on the live-stream room interface. The embodiment of the present application does not specifically limit the first resource, and the first resource can be, for example, a virtual resource such as equipment, props, or clothing.

The embodiments of the present application do not specifically limit the manner in which the target account acquires the first resource. In an example, the target account can acquire the first resource by completing a specific task. In another example, the target account can acquire the first resource by purchasing. In an example, the first resource can be associated with an account attribute of the target account, such as an account level. In another example, the first resource can also have corresponding right, and the target account can use the right corresponding to the first resource when triggering an interactive operation on the live-stream room interface.

In an example, the client may display the resource identifier of the first resource in a preset area in the live-stream room interface. The embodiment of the present application does not specifically limit the resource identifier of the first resource, and the resource identifier of the first resource may be, for example, an image, animation, or name of the first resource.

In an example, in a specific implementation where the client displays the resource identifier of the first resource, the resource identifier of the first resource may be displayed in a static display manner. For example, a static image corresponding to the resource identifier is displayed during displaying the resource identifier of the first resource.

In another example, in a specific implementation where the client displays the resource identifier of the first resource, the resource identifier of the first resource can be displayed in a dynamic manner. In a specific example, the client can display a video corresponding to the resource identifier of the first resource, and the video image of the video can comprise the resource identifier of the first resource. In addition, in order to enrich the display of the content of the video, the content of the video can comprise not only the resource identifier of the first resource, but also a virtual object associated with the first resource. In this way, through the video, the user can acquire more information related to the first resource. Regarding the virtual object associated with the first resource, the embodiment of the present application does not make specific limitations. For example, if the first resource is clothing or equipment related to stars, then the virtual object associated with the first resource can be stars. In another example, if the first resource is clothing or equipment related to the earth, then the virtual object associated with the first resource can be the earth.

In an example, in order to facilitate the user to determine, through the content displayed by the client, that the target account has sent the second resource to the streamer account, the client can also display prompt information on the live-stream room interface. The prompt information is used to prompt that the target account has sent the second resource. The embodiment of the present application does not specifically limit the prompt information, and the prompt information can comprise, for example, the resource identifier of the second resource and descriptive information indicating the sending operation.

In an example, the resource identifier of the second resource may be, for example, an image or animation of the second resource, or may be, for example, the name of the second resource.

In an example, the descriptive information indicating the sending operation may be, for example, "XX was sent", wherein "XX" may be the name of the second resource. In another example, the descriptive information indicating the sending operation may also be text information which is more concise, for example, it may be text such as "successful sending" or "successful naming". In a specific example where the client displays the prompt information, the account identifier of the target account may be displayed first. The account identifier of the target account comprises an account avatar and an account name. In addition, the first prompt text, such as the aforementioned "XX was sent", may be displayed in the display area of the account name. After the first prompt text and the account name are displayed for a certain period of time, the display of the account name and the first prompt text may be cancelled, and the resource identifier of the second resource and the second prompt text, such as the aforementioned "successful naming", may be displayed in the display area of the account name. In an example, the resource identifier of the aforementioned first resource and the prompt information may be displayed in a preset area in the live-stream room interface. Considering that the resource identifier of the first resource and the prompt information are displayed in the preset area at the same time, the area occupied by the first area will be relatively large, which will affect the display of other content on the live-stream room interface. To avoid this problem, in an example, the client may first display the resource identifier of the first resource in the preset area, and after the display of the resource identifier of the first resource is completed, the client may display the prompt information in the preset area, thereby effectively utilizing the preset area with appropriate size to display the prompt information and the resource identifier of the first resource.

In a specific example, the aforementioned second resource may be a live-stream room gift, and the aforementioned resource sending operation may be a gift sending operation. In this case, using the solution of the embodiment of the present application, the client can display the resource identifier of the first resource in the first target area (e.g., gift tray area) of the live-stream room interface in response to the gift sending operation of the target account for the live-stream room gift. In addition, in response to the display of the resource identifier of the first resource is completed, the prompt information corresponding to the second resource is displayed in the second target area of the live-stream room interface, to prompt that the target account has sent the second resource. The prompt information may comprise the account identifier of the target account (such as avatar, name), the resource identifier of the second resource (such as a gift thumbnail icon). In addition, the resource image, video or audio corresponding to the second resource can also be displayed in the second target area of the live-stream room interface. In this way, by combining the interaction of the first resource and the second resource, the interaction of the live-stream room is enriched, and by making full use of the gift tray area to display gifts and props, it conforms to the user's cognition and improves the efficiency of acquiring information.

In an example, the client may also display a recommendation card of the target account in response to a trigger operation for the prompt information. The recommendation card displays an account identifier of the target account and an interactive control. The interactive control is used to interact with the target account. For example, the interactive control may comprise a following control, through which an operation of following the target account may be triggered.

In yet another example, the client may also display a recommendation card of the target account in response to a trigger operation for an account identifier in the prompt information.

In another example, the client can display a resource panel in response to a trigger operation for the resource identifier of the second resource. The resource panel displays the resource identifier of the second resource and a resource transfer control, and the resource transfer control is used to acquire the second resource. This facilitates the user's needs to acquire the second resource and interact with the target account, thereby improving efficiency of the interaction.

In an example, after the client displays the resource identifier of the first resource, the user can also trigger a preset operation through the resource identifier of the first resource, such as clicking on the resource identifier of the first resource. Accordingly, the client can display the details interface of the first resource in response to the preset operation for triggering the resource identifier of the first resource. In this way, the user can quickly view the details interface of the first resource through the resource identifier of the first resource displayed on the live-stream room interface, without having to perform other complex interactive operations to view the details interface of the first resource, which simplifies user operations and improves the interactive experience. In a specific example, if the client displays the resource identifier of the first resource by displaying a video corresponding to the resource identifier of the first resource, the user can trigger a preset operation through the video, such as clicking on the video. Accordingly, the client can display the details interface of the first resource in response to the preset operation for triggering the video.

Regarding the details interface of the first resource, it should be noted that the details interface of the first resource can be used to display the details information of the first resource. The details information of the first resource comprise but are not limited to one or more of the name of the first resource, the image of the first resource, and the introduction of the first resource.

In an example, in addition to displaying the details information of the first resource, other content may also be displayed on the details interface of the first resource. As a specific example, the details interface of the first resource may comprise multiple areas, and the multiple areas may comprise a first area and a second area, wherein the first area may be used to display resource option of at least one resource. In this case, the first area displays resource options of multiple resources, which allows the user to determine the multiple resources that can be acquired, thereby improving the efficiency of acquiring information by the user. In an embodiment of the present application, the resource option of the at least one resource comprises resource option of the first resource, and the second area is used to display the details information of the first resource. In an example, the resource option of the first resource displayed in the first area may be in a selected state to prompt the user that the details information currently displayed in the second area is the details information corresponding to the first resource.

Regarding the resource option, it is used to identify the resource. In an example, the resource option may comprise the name of the resource and the image corresponding to the resource. In an example, the resource option in the selected state comprises the name of the resource and the image corresponding to the resource; the resource option in the non-selected state comprises the name of the resource but does not comprise the image corresponding to the resource. In this way, it is convenient for users to distinguish between the resources in the selected state and the resources in the non-selected state.

In an example, in a specific implementation where the client displays the details information of the first resource in the second area, the details information of the first resource can be displayed in a static display manner or in a dynamic display manner, which is not specifically limited in the embodiment of the present application. Displaying the details information of the first resource in a dynamic manner in the second area can bring a better interactive experience to the user.

In an example, the first resource may also be associated with a first object. The embodiment of the present application does not specifically limit the first object. The first object may be, for example, a certain person. For example, if the first resource is clothing corresponding to a star maker, then the first object may be the person of the star maker. For this case, the second area may also comprise a first interactive identifier. Accordingly, the user may trigger an operation for the first interactive identifier, such as clicking on the first interactive identifier. Accordingly, the client may display the object information of the first object in response to the triggering operation for the first interactive identifier. In this way, the user can view the object information of the first object through the first interactive identifier, thereby understanding the object information of the first object and deepening the understanding of the first resource. The embodiment of the present application does not specifically limit the first interactive identifier. The first interactive identifier may, for example, comprise a corresponding text description and an icon.

In an example, in a specific implementation where the client displays the information of the first object, text information introducing the first object can be displayed, for example. In another example, considering that video can convey information more intuitively than text, the client can play an introduction video of the first object when displaying the information of the first object in a specific implementation.

In an example, a user may trigger a first operation in the second area, such as triggering a sliding operation. Accordingly, the client may display the right information of the first right comprised in the first resource in the second area in response to the first operation triggered in the second area. The embodiment of the present application does not specifically limit the right information of the first right. The right information of the first right may comprise, for example, a right icon of the first right, a right name of the first right, and specific right comprised in the first right. In an example, the client may replace the content (such as the details information of the first resource) currently displayed in the second area with the right information of the first right in response to the first operation. In this way, the user can trigger the first operation in the second area to view the right information of the first right comprised in the first resource, thereby improving the interactive experience.

Regarding the right comprised in the first resource, for example, the right comprised in the first resource may comprise, for example, one or more of the following: live-stream room entrance effects, recommendation cards, special display styles corresponding to the account avatar, and sending of special resources. Among them, the live-stream room entrance effects refer to playing the corresponding live-stream room entrance effects when the target account enters the live-stream room. The information card refers to displaying the recommendation card corresponding to the target account after other accounts trigger an operation on the live-stream room interface in response to the aforementioned prompt information. The special display style corresponding to the account avatar refers to, for example, adding an outer frame around the account avatar that corresponds to the first resource. The sending of special resources refers to sending on the live-stream room interface the resources which cannot be sent by accounts that do not have the first resource.

In another example, the details interface of the first resource may comprise a third area in addition to the first area and the second area, and the third area may be used to display the right identifier of at least one right comprised in the first resource. The right identifier mentioned here may comprise, for example, a right icon and a right name. The user may trigger a second operation for the right identifier of the second right displayed in the third area, for example, by clicking on the right identifier of the second right. Accordingly, the client may display the right information of the second right in the second area in response to the second operation for triggering the right identifier of the second right. In this way, the user may trigger the second operation for the right identifier of any right that the user is interested in, so as to view the right information of the right. Thus, it is more convenient for the user to operate. In a specific implementation where the client displays the right information of the second right in the second area, for example, the content (for example, the details information of the first resource) currently displayed in the second area may be replaced with the right information of the second right. Among them, the right information of the second right may comprise, for example, the right icon of the second right, the right name of the second right, and the specific right comprised in the second right. In an example, if the client can display the details information of the first resource in the second area for a preset display duration, and if the user neither trigger the first operation in the second area nor trigger the second operation in the third area within the preset display duration of the details information of the first resource, the client can display the right information of the third right comprised in the first resource in the second area after a completion of displaying of the details information of the first resource. In a specific implementation where the client displays the right information of the third right in the second area, for example, the details information of the first resource currently displayed in the second area can be replaced with the right information of the third right. The right information of the third right can comprise, for example, the right icon of the third right, the right name of the third right, and the specific right comprised in the third right. Similarly, if the user neither trigger the first operation in the second area nor the second operation in the third area within the preset display duration of the right information of the third right, the client can display the right information of another right, such as the fourth right, comprised in the first resource in the second area after a completion of displaying the right information of the third right. Similarly, if the user does not actively trigger the operation of switching the right information (such as the first operation and the second operation mentioned above), the client can automatically loop playback the right information of each right comprised in the first resource in the second area. In this way, the user can fully understand the information of the first resource through the second area.

In an example, the details interface of the first resource may also comprise a resource acquisition control, through which the user can trigger an operation. Accordingly, the client may display a resource exchange interface in response to the operation for triggering the resource acquisition control. If the user triggers a resource exchange operation on the resource exchange interface, the client may acquire the first resource. This approach is conducive to meeting the user's need to quickly acquire the first resource, simplifies the operation of acquiring the first resource, shortens the interaction path, and improves the user experience.

In an example, the first area displays a resource option of at least one resource. If the user is interested in other resources, the third operation can be triggered in the first area to view the details information of other resources. In a specific example, the third operation can be a sliding operation, and the client can, for example, determine the third resource corresponding to the sliding operation based on the operation distance of the sliding operation. In another specific example, the third operation can, for example, be a selection operation for the third resource, such as a click operation for the third resource. After the user triggers the third operation in the first area, the client can dynamically display the details information of the third resource in the second area. Accordingly, in order to allow the user to determine that the content currently displayed in the second area is the corresponding information of the third resource, the client can also switch the state of the resource option of the third resource displayed in the first area to a selected state, and switch the state of the resource option of the first resource displayed in the first area to an non-selected state. In this way, the user can view the relevant information of the third resource by triggering the third operation in the first area, thereby improving the efficiency of acquiring the relevant information of the third resource by the user.

The specific implementation of the client displaying the details information of the third resource in the second area may refer to the above specific description of the client displaying the details information of the first resource in the second area, which will not be repeated here. In addition, after the user triggers the third operation in the first area, the content displayed in the third area is also synchronously updated to the right identifier of at least one right comprised in the third resource.

It can be seen that, by utilizing the solution of the embodiment of the present application, for a target account having a first resource, after performing a resource sending operation in the live-stream room, the resource identifier of the first resource can be displayed on the live-stream room interface. Thus, by combining the first resource and the second resource, the interaction for sending resources in the live-stream room is enriched, which is conducive to meeting the diverse needs of the user.

The above describes the method for information display provided in the embodiment of the present application. Next, the solution provided in the embodiment of the present application is described with reference to specific examples.

Figure 2A:
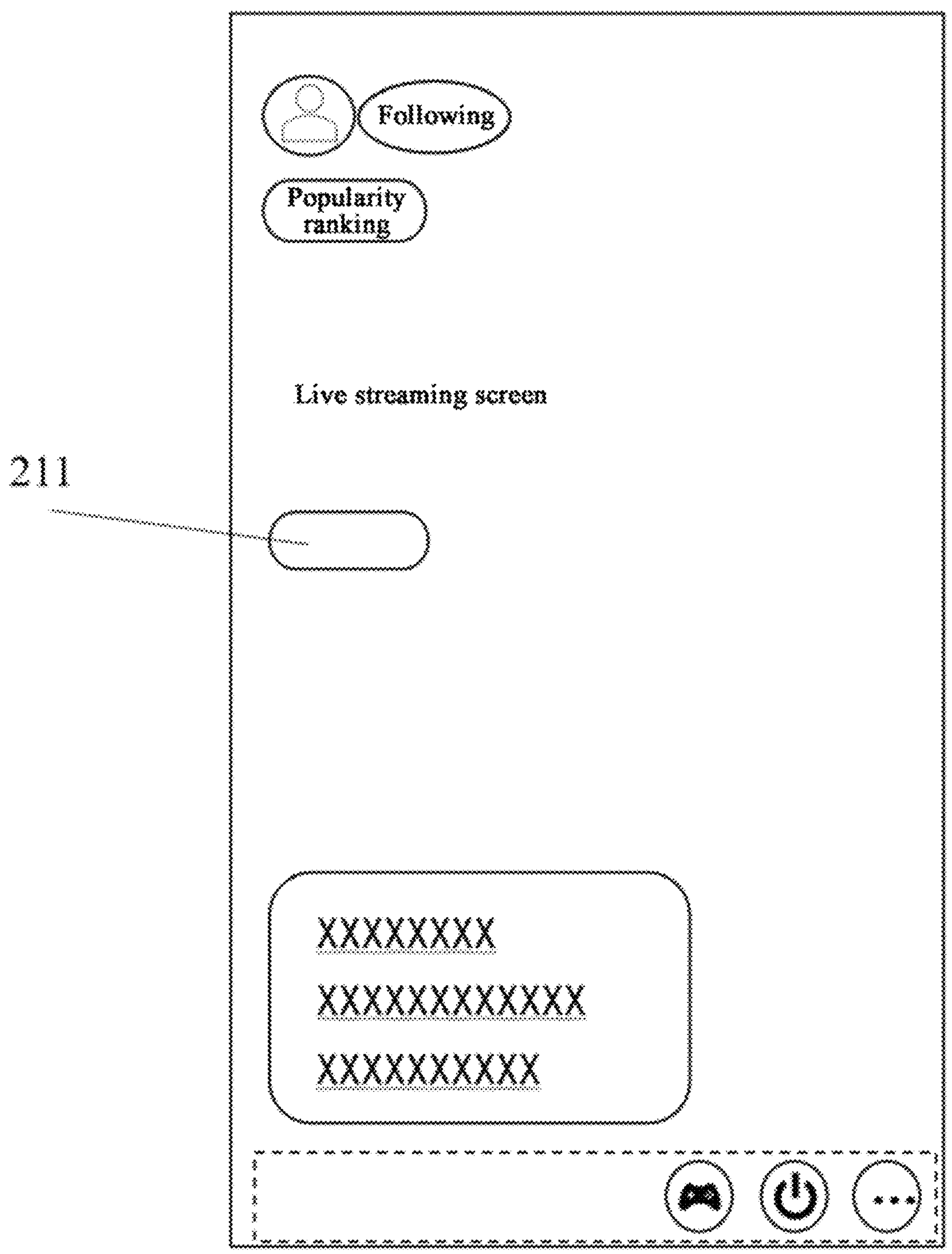
FIG. 2*a* is a schematic diagram of a live-stream room interface provided in an embodiment of the present application.

After the resource sending operation is performed by the target account, the live-stream room interface is shown in FIG. 2*a*. FIG. 2*a* is a structural diagram of a live-stream room interface provided in an embodiment of the present application.

As shown in FIG. 2*a*, the first target area 211 in the live-stream room interface is used to display the video of the resource identifier corresponding to the first resource.

Figure 2B:
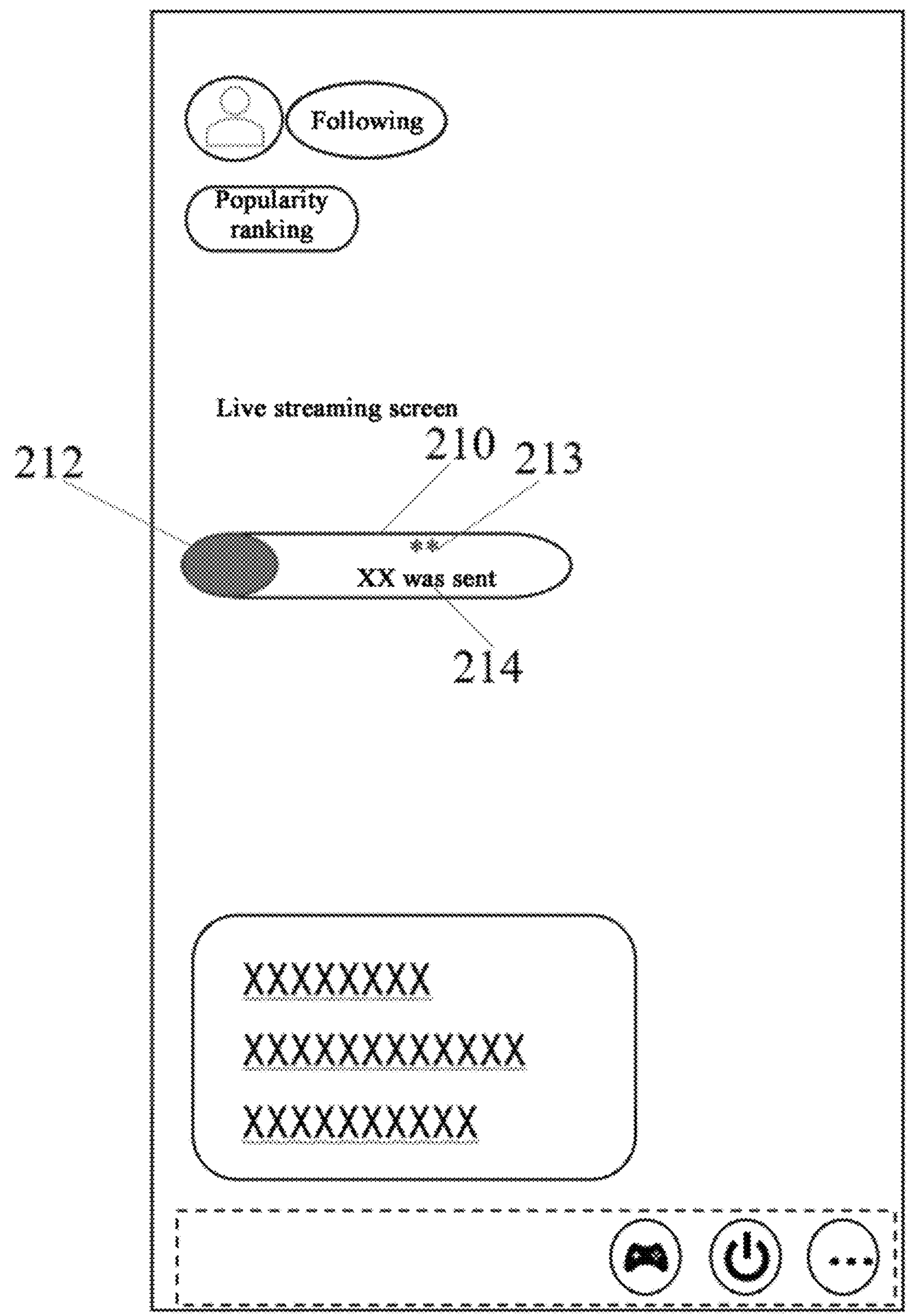
FIG. 2*b* is a schematic diagram of another live-stream room interface provided in an embodiment of the present application.

After a completion of displaying the video, the live-stream room interface displayed by the client is shown in FIG. 2*b*. The second target area 210 displays the account avatar 212 of the target account, the account name "" 213 of the target account, and the first prompt text "XX was sent" 214. In an example, the first target area 211 may be a sub-area of the second target area 210**. In an example, the second target area may correspond to the preset area mentioned in the above embodiment.

Figure 2C:
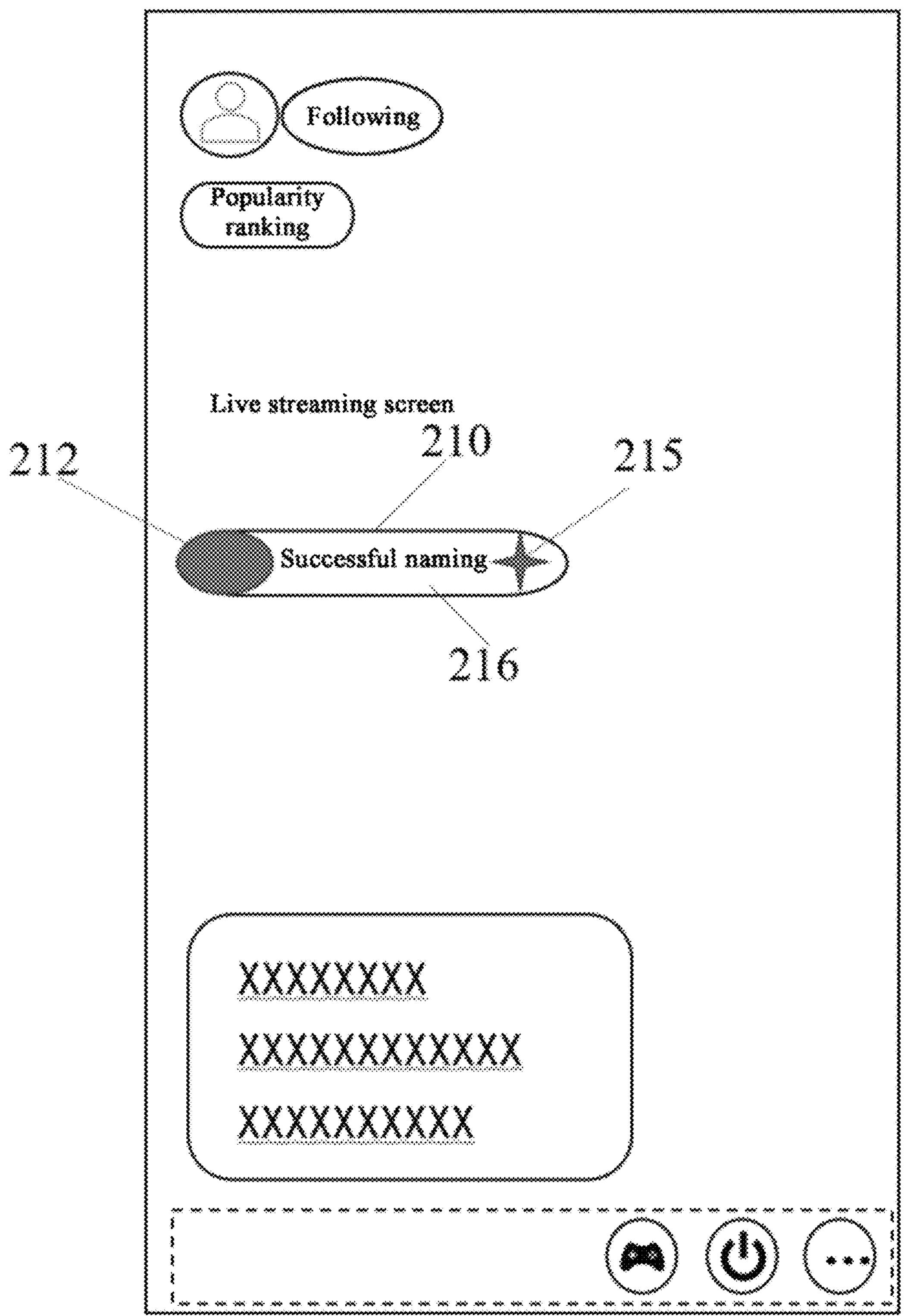
FIG. 2*c* is a schematic diagram of yet another live-stream room interface provided in an embodiment of the present application.

After the first prompt text 214 and the account name 213 are displayed for a certain period of time, the live-stream room interface displayed by the client is shown in FIG. 2*c*, and the display content of the display area corresponding to the account name 213 of the target account is updated to the resource identifier 215 of the second resource and the second prompt text "successful naming" 216.

Figure 2D:
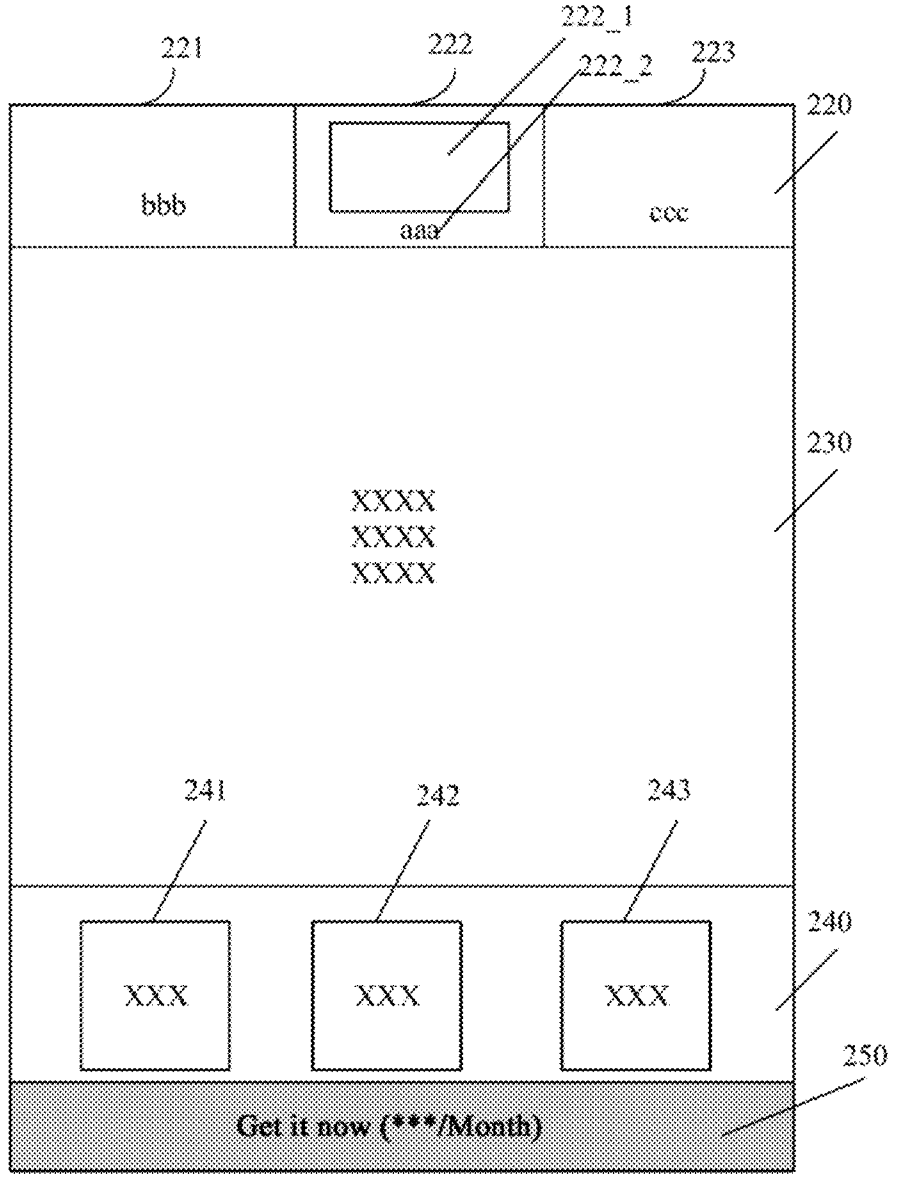
FIG. 2*d* is a schematic diagram of a details interface of a first resource provided in an embodiment of the present application.

In an example, if the user triggers a preset operation for the video displayed in the sub-area 211, the client can display the details interface of the first resource shown in FIG. 2*d*. As shown in FIG. 2*d*, the details interface of the first resource comprises three areas, namely the first area 220, the second area 230 and the third area 240. The first area displays resource options of multiple resources, corresponding to 221, 222 and 223 in FIG. 2*d*, respectively, where 222 is the resource option corresponding to the first resource, which comprises the image 222_1 of the resource and the name 222_2 of the resource (indicated by aaa in FIG. 2*d*), and 221 and 223 do not comprise the image of the resource, but comprise the name of the resource (indicated by bbb and ccc in FIG. 2*d*, respectively). The second area 230 displays details information of the first resource (indicated by X XX in FIG. 2*d*), and the third area displays right identifiers of multiple right comprised in the first resource, which correspond to 241, 242 and 243 shown in FIG. 2*d*, respectively. The specific contents of 241, 242 and 243 are indicated by "XXX" in FIG. 2*d*.

In addition, the details interface of the first resource may further comprise a resource acquisition control 250, through which the user may trigger an operation of acquiring the first resource, wherein the in 250 may be a resource that needs to be exchanged to acquire the first resource.

For the interactive operations supported by the details interface of the first resource, please refer to the relevant description section above, which will not be repeated here.

It should be noted that FIGS. 2*a* to 2*d* are shown for the purpose of understanding the relevant contents of this solution and do not constitute a limitation on the embodiments of the present application.

Exemplary Apparatus

Based on the method provided in the above embodiment, the embodiment of the present application further provides an apparatus, which is described below in conjunction with the accompanying drawings.

Figure 3:
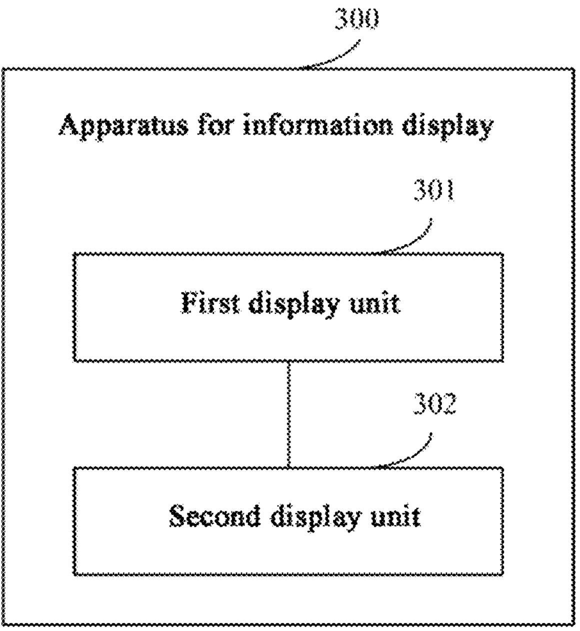
FIG. 3 is a schematic diagram of a structure of an apparatus for information display provided in an embodiment of the present application.

Referring to FIG. 3, which is a schematic diagram of the structure of an apparatus for information display provided in an embodiment of the present application. The apparatus 300 may specifically comprise a first display unit 301 and a second display unit 302.

The first display unit 301 is used to display the live-stream room interface.

The second display unit 302 is used to display the resource identifier of the first resource on the live-stream room interface in response to a resource sending operation of a target account having the first resource. The resource sending operation is used to send the second resource to the streamer account.

Optionally, the apparatus further comprises:

a third display unit, used to display prompt information on the live-stream room interface in response to a completion of displaying the resource identifier of the first resource. Wherein the prompt information is used to prompt that the target account has sent the second resource. The prompt information comprises the resource identifier of the second resource and descriptive information indicating the sending operation.

Optionally, the third display unit is used to:

display the prompt information in the preset area, in response to a completion of displaying the resource identifier of the first resource in the preset area of the live-stream room interface.

Optionally, the second display unit 302 is used to:

display a video corresponding to the resource identifier of the first resource, and wherein the video image of the video comprises the resource identifier of the first resource.

Optionally, the apparatus further comprises:

a fourth display unit, used to display the details interface of the first resource in response to the preset operation for triggering the resource identifier of the first resource or the video.

Optionally, the details interface of the first resource comprises a first area and a second area, and the fourth display unit is used to:

display a resource option of at least one resource in the first area, wherein the at least one resource comprises the first resource, and the resource option of the first resource is in a selected state; and dynamically display details information of the first resource in the second area.

Optionally, the first resource is associated with a first object, the second area further comprises a first interactive identifier, and the apparatus further comprises:

a fifth display unit, used to display an object information of the first object in response to a trigger operation on the first interactive identifier.

Optionally, the fifth display unit is used to play an introduction video of the first object.

Optionally, the apparatus further comprises:

a sixth display unit, used to:

display, in the second area, right information of a first right comprised in the first resource, in response to a first operation triggered in the second area; or display right information of the second right in the second area, in response to a second operation for triggering a right identifier of a second right in a third area of the details interface, wherein the third area is used to display a right identifier of at least one right comprised in the first resource, and the at least one right comprises the second right.

Optionally, the apparatus further comprises:

a seventh display unit, used to display the right information of the third right comprised in the first resource in the second area after a completion of displaying the details information of the first resource.

Optionally, the apparatus further comprises:

an eighth display unit, used to dynamically display details information of a third resource in the second area in response to a third operation triggered in the first area;

a state switching unit, used to switch the state of the resource option of the third resource displayed in the first area to a selected state.

Since the apparatus 300 is an apparatus corresponding to the method provided in the above method embodiment, the specific implementation of each unit of the apparatus 300 is based on the same concept as the above method embodiment. Therefore, for the specific implementation of each unit of the apparatus 300, reference can be made to the description part of the above method embodiment, which will not be repeated here.

The embodiment of the present application also provides a device. The device comprises a processor and a memory.

The processor is used to execute instructions stored in the memory so that the device executes the method for information display described in any of the above method embodiments.

An embodiment of the present application provides a non-transitory computer-readable storage medium comprising instructions, wherein the instructions instruct a device to execute the method for information display as described in any of the above method embodiments.

An embodiment of the present application provides a computer program product, wherein the computer program product, when executed on a computer, causes the computer to execute the method for information display as described in any of the above method embodiments.

Those skilled in the art will readily appreciate other embodiments of the present application after considering the specification and practicing the invention disclosed herein. The present application is intended to cover any modification, use or adaptive change of the present application, which follows the general principles of the present application and comprises common knowledge or conventional technical means in the art that are not disclosed in the present disclosure. The specification and examples are intended to be exemplary only, and the true scope and spirit of the present application are indicated by the following claims.

It should be understood that the present application is not limited to the precise structures that have been described above and shown in the drawings, and that various modifications and changes may be made without departing from the scope thereof. The scope of the present application is limited only by the appended claims.

The above description is only a preferred embodiment of the present application and is not intended to limit the present application. Any modifications, equivalent substitutions, improvements, etc. made within the spirit and principles of the present application should be comprised in the protection scope of the present application.

We claim:

1. A method for information display, comprising:

displaying a live-stream room interface; and displaying a resource identifier of a first resource on the live-stream room interface, in response to a resource sending operation of a target account having the first resource, wherein the resource sending operation is used to send a second resource to a streamer account, and the second resource is independent of the first resource.

2. The method according to claim 1, further comprising:

displaying prompt information on the live-stream room interface, in response to a completion of displaying the resource identifier of the first resource, wherein the prompt information is used to prompt that the target account has sent the second resource, and wherein the prompt information comprises a resource identifier of the second resource and descriptive information indicating a sending operation.

3. The method according to claim 2, wherein displaying the prompt information on the live-stream room interface in response to the completion of displaying the resource identifier of the first resource comprises:

displaying the prompt information in a preset area of the live-stream room interface, in response to a completion of displaying the resource identifier of the first resource in the preset area.

4. The method according to claim 1, wherein displaying the resource identifier of the first resource on the live-stream room interface comprises:

displaying a video corresponding to the resource identifier of the first resource, wherein a video image of the video comprises the resource identifier of the first resource.

5. The method according to claim 1, further comprising:

displaying a details interface of the first resource, in response to a preset operation for triggering the resource identifier of the first resource or the video.

6. The method according to claim 5, wherein the details interface of the first resource comprises a first area and a second area, and wherein displaying the details interface of the first resource comprises:

displaying a resource option of at least one resource in the first area, wherein the at least one resource comprises the first resource, and a resource option of the first resource is in a selected state; and dynamically displaying details information of the first resource in the second area.

7. The method according to claim 6, wherein the first resource is associated with a first object, and the second area further comprises a first interactive identifier, and wherein the method further comprises:

displaying object information of the first object, in response to a trigger operation for the first interactive identifier.

8. The method according to claim 7, wherein displaying object information of the first object comprises:

playing an introduction video of the first object.

9. The method according to claim 6, further comprising:

displaying, in the second area, right information of a first right comprised in the first resource, in response to a first operation triggered in the second area; or displaying, in the second area, right information of a second right, in response to a second operation for triggering a right identifier of the second right in a third area of the details interface, wherein the third area is used to display a right identifier of at least one right comprised in the first resource, and wherein the at least one right comprises the second right.

10. The method according to claim 6, further comprising:

displaying, in the second area, right information of a third right comprised in the first resource, after a completion of displaying the details information of the first resource.

11. The method according to claim 6, further comprising:

dynamically displaying, in the second area, details information of a third resource, in response to a third operation triggered in the first area, and switching a state of a resource option of the third resource displayed in the first area into a selected state.

12. A device comprising a processor and a memory, wherein the processor is used to execute instructions stored in the memory, to cause the device to:

display a live-stream room interface; and display a resource identifier of a first resource on the live-stream room interface, in response to a resource sending operation of a target account having the first resource, wherein the resource sending operation is used to send a second resource to a streamer account, and the second resource is independent of the first resource.

13. A non-transitory computer-readable storage medium comprising instructions, wherein the instructions instruct a device to:

display a live-stream room interface; and display a resource identifier of a first resource on the live-stream room interface, in response to a resource sending operation of a target account having the first resource, wherein the resource sending operation is used to send a second resource to a streamer account, and the second resource is independent of the first resource.

14. The device according to claim 12, wherein the processor further causes the device to:

display prompt information on the live-stream room interface, in response to a completion of displaying the resource identifier of the first resource, wherein the prompt information is used to prompt that the target account has sent the second resource, and wherein the prompt information comprises a resource identifier of the second resource and descriptive information indicating a sending operation.

15. The device according to claim 14, wherein the instructions cause the device to display the prompt information on the live-stream room interface in response to the completion of displaying the resource identifier of the first resource further causes the device to:

display the prompt information in a preset area of the live-stream room interface, in response to a completion of displaying the resource identifier of the first resource in the preset area.

16. The device according to claim 12, wherein the instructions cause the device to display the resource identifier of the first resource on the live-stream room interface further causes the device to:

display a video corresponding to the resource identifier of the first resource, wherein a video image of the video comprises the resource identifier of the first resource.

17. The device according to claim 12, wherein the processor further causes the device to:

display a details interface of the first resource, in response to a preset operation for triggering the resource identifier of the first resource or the video.

18. The device according to claim 17, wherein the details interface of the first resource comprises a first area and a second area, and wherein the instructions cause the device to display the details interface of the first resource further causes the device to:

display a resource option of at least one resource in the first area, wherein the at least one resource comprises the first resource, and a resource option of the first resource is in a selected state; and dynamically display details information of the first resource in the second area.

19. The device according to claim 18, wherein the first resource is associated with a first object, and the second area further comprises a first interactive identifier, and wherein the processor further causes the device to:

display object information of the first object, in response to a trigger operation for the first interactive identifier.

20. The device according to claim 19, wherein the instructions cause the device to display object information of the first object further causes the device to:

play an introduction video of the first object.

* * * * *